US011899405B2

(12) United States Patent
Okuhata

(10) Patent No.: US 11,899,405 B2
(45) Date of Patent: Feb. 13, 2024

(54) ELECTRONIC WATCH, MOTOR CONTROL CIRCUIT, AND METHOD FOR CONTROLLING ELECTRONIC WATCH

(71) Applicant: Seiko Epson Corporation, Tokyo (JP)

(72) Inventor: Tomoki Okuhata, Shiojiri (JP)

(73) Assignee: SEIKO EPSON CORPORATION

( * ) Notice: Subject to any disclaimer, the term of this patent is extended or adjusted under 35 U.S.C. 154(b) by 911 days.

(21) Appl. No.: 16/903,522

(22) Filed: Jun. 17, 2020

(65) Prior Publication Data

US 2020/0401086 A1 Dec. 24, 2020

(30) Foreign Application Priority Data

Jun. 18, 2019 (JP) ................................ 2019-112526

(51) Int. Cl.

| | |
|---|---|
| ***G04C 15/00*** | (2006.01) |
| ***G04C 10/04*** | (2006.01) |
| ***G04C 13/04*** | (2006.01) |

(52) U.S. Cl.

CPC ......... *G04C 15/0054* (2013.01); *G04C 10/04* (2013.01); *G04C 13/049* (2013.01)

(58) Field of Classification Search

CPC ... G04C 15/0054; G04C 10/04; G04C 13/049
See application file for complete search history.

(56) References Cited

U.S. PATENT DOCUMENTS

| | | | | |
|---|---|---|---|---|
| 4,542,329 A | | 9/1985 | Tu Xuan | |
| 6,072,752 A | * | 6/2000 | Igarashi | G04C 3/146 368/80 |
| 2010/0001673 A1 | * | 1/2010 | Cardoletti | H02P 6/18 318/400.34 |
| 2011/0080132 A1 | * | 4/2011 | Ogasawara | H02P 8/38 368/80 |

FOREIGN PATENT DOCUMENTS

| | | |
|---|---|---|
| JP | S54-002092 A | 1/1979 |
| JP | H01-214279 A | 8/1989 |
| JP | H02-33108 B2 | 7/1990 |
| JP | 2009-542186 A | 11/2009 |
| JP | 2010-283089 A | 12/2010 |
| JP | 2015-180137 A | 10/2015 |
| JP | 2017-135314 A | 8/2017 |

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

An electronic watch includes a driver controlled to be in an ON state in which a drive current is supplied to a coil of a motor and an OFF state in which the drive current is not supplied to the coil, a target current value setter configured to set a target current value in accordance with a drive voltage for driving the motor, and a driver controller configured to compare a detected current value of a current flowing to the coil with the target current value, control the driver to be in the ON state or the OFF state in accordance with a result of the comparison, and switch polarity of the drive current when detecting that an ON time, which is a duration of the ON state of the driver, meets a predetermined condition or an OFF time, which is a duration of the OFF state of the driver, meets a predetermined condition.

4 Claims, 8 Drawing Sheets

ELECTRONIC WATCH, MOTOR CONTROL CIRCUIT, AND METHOD FOR CONTROLLING ELECTRONIC WATCH

The present application is based on, and claims priority from JP Application Serial Number 2019-112526, filed Jun. 18, 2019, the disclosure of which is hereby incorporated by reference herein in its entirety.

BACKGROUND

1. Technical Field

The present disclosure relates to an electronic watch, a motor control circuit, and a method for controlling an electronic watch.

2. Related Art

JP-T-2009-542186 discloses a technique for controlling continuous rotation of a motor by turning off a supply of a current to a coil of the motor when a current flowing to the coil exceeds a maximum threshold value, turning on the supply when the current falls below a minimum threshold value, and estimating a position of a rotor of the motor from an ON time during which power supply continues or an OFF state during which the power supply continues to stop.

In the control technique, a voltage applied to the coil of the motor also fluctuates when a voltage of a battery fluctuates, for example. In this case, the ON time during which the power supply continues and the OFF time during which the power supply continues to stop also change in accordance with the fluctuation in voltage. Then, a position of the rotor cannot be appropriately estimated from the ON time and the OFF time, and there is a problem in that control of the motor becomes unstable.

SUMMARY

An electronic watch according to the present disclosure includes a motor including a coil, a power source configured to generate a drive voltage for driving the motor, a driver controlled to be in an ON state in which a drive current is supplied to the coil and an OFF state in which the drive current is not supplied to the coil, a current detector configured to detect a current value of a current flowing to the coil, a target current value setter configured to set a target current value in accordance with the drive voltage, and a driver controller configured to compare the current value detected by the current detector with the target current value, control the driver to be in the ON state or the OFF state in accordance with a result of the comparison, and switch polarity of the drive current when detecting that an ON time, which is a duration of the ON state of the driver, or an OFF time, which is a duration of the OFF state of the driver, meets a predetermined condition.

In the electronic watch according to the present disclosure, the target current value setter may include a resistor voltage dividing circuit configured to generate the target current value in accordance with the drive voltage.

The electronic watch according to the present disclosure may include a voltage detection circuit configured to detect the drive voltage, where the target current value setter may calculate and then set the target current value in accordance with a a value detected by the voltage detection circuit.

A movement according to the present disclosure includes a motor including a coil, a power source configured to generate a drive voltage for driving the motor, a driver controlled to be in an ON state in which a drive current is supplied to the coil and an OFF state in which the drive current is not supplied to the coil, a current detector configured to detect a current value of a current flowing to the coil, a target current value setter configured to set a target current value in accordance with the drive voltage, and a driver controller configured to compare the current value detected by the current detector with the target current value, control the driver to be in the ON state or the OFF state in accordance with a result of the comparison, and switch polarity of the drive current when detecting that an ON time, which is a duration of the ON state of the driver, or an OFF time, which is a duration of the OFF state of the driver, meets a predetermined condition.

A motor control circuit according to the present disclosure includes a driver controlled to be in an ON state in which a drive current is supplied to a coil of a motor and an OFF state in which the drive current is not supplied to the coil, a current detector configured to detect a current value of a current flowing to the coil, a target current value setter configured to set a target current value in accordance with a drive voltage of a power source configured to drive the motor, and a driver controller configured to compare the current value detected by the current detector with the target current value, control the driver to be in the ON state or the OFF state in accordance with a result of the comparison, and switch polarity of the drive current when detecting that an ON time, which is a duration of the ON state of the driver, or an OFF time, which is a duration of the OFF state of the driver, meets a predetermined condition.

A method for controlling an electronic watch according to the present disclosure including a motor including a coil and a rotor, a power source configured to generate a drive voltage for driving the motor, and a driver controlled to be in an ON state in which a drive current is supplied to the coil and an OFF state in which the drive current is not supplied to the coil, the method including detecting the drive voltage, calculating and then setting a target current value in accordance with the detected drive voltage, detecting a current value of a current flowing to the coil, comparing the detected current value with the target current value, and controlling the driver to be in the ON state or the OFF state in accordance with a result of the comparison, and switching polarity of the drive current when detecting that an ON time, which is a duration of the ON state of the driver, or an OFF time, which is a duration of the OFF state of the driver, meets a predetermined condition.

DESCRIPTION OF EXEMPLARY EMBODIMENTS

First Exemplary Embodiment

An electronic watch 1 according to a first exemplary embodiment of the present disclosure will be described below with reference to the drawings.

Figure 1:
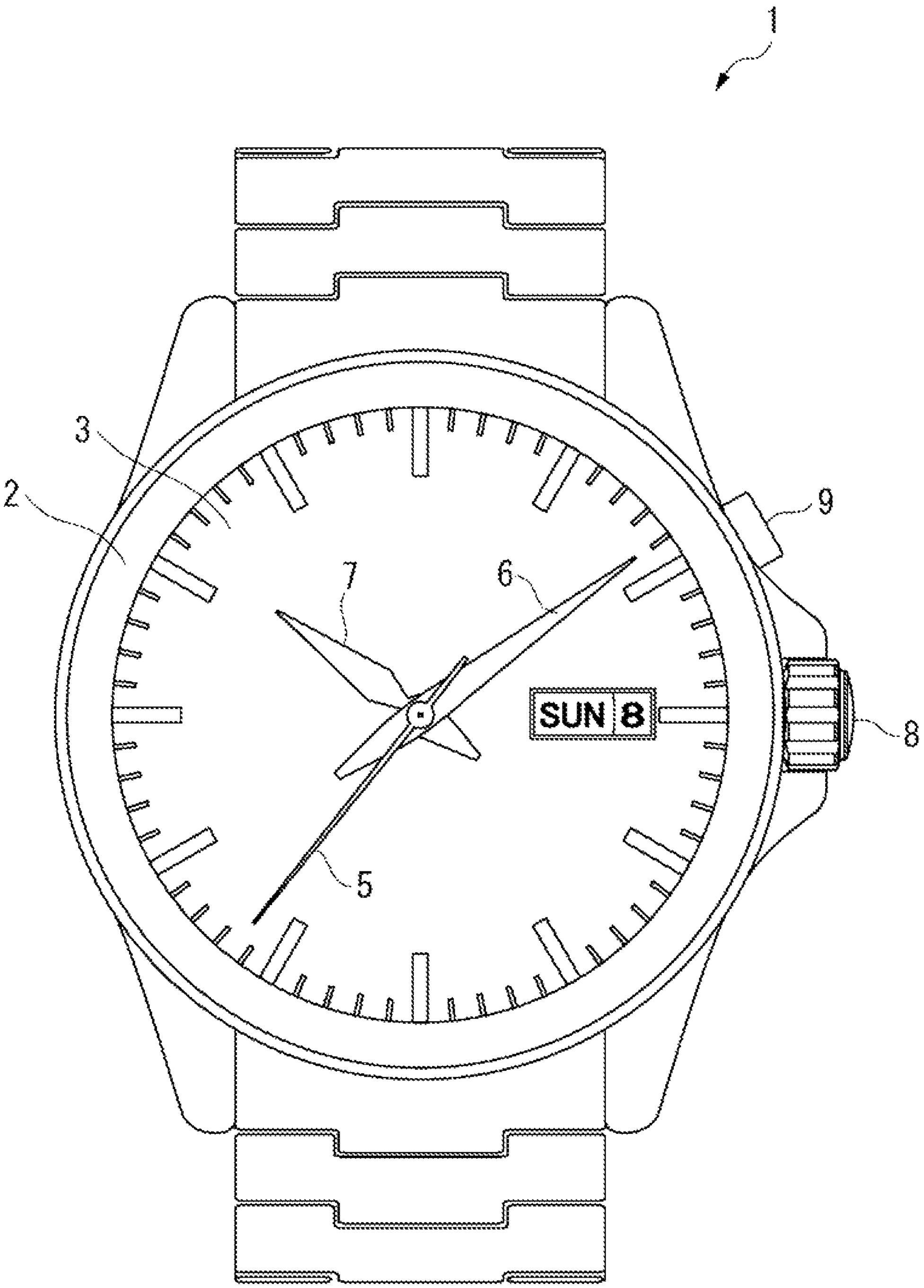
FIG. 1 is a front view illustrating an electronic watch according to a first exemplary embodiment.

FIG. 1 is a front view illustrating the electronic watch 1.

As illustrated in FIG. 1, the electronic watch 1 is a watch mounted on a user's wrist, and includes an outer case 2, a dial 3 having a disk shape, a seconds hand 5, a minute hand 6, an hour hand 7, a crown 8, and a button 9.

Circuit Diagram of Electronic Watch

Figure 2:
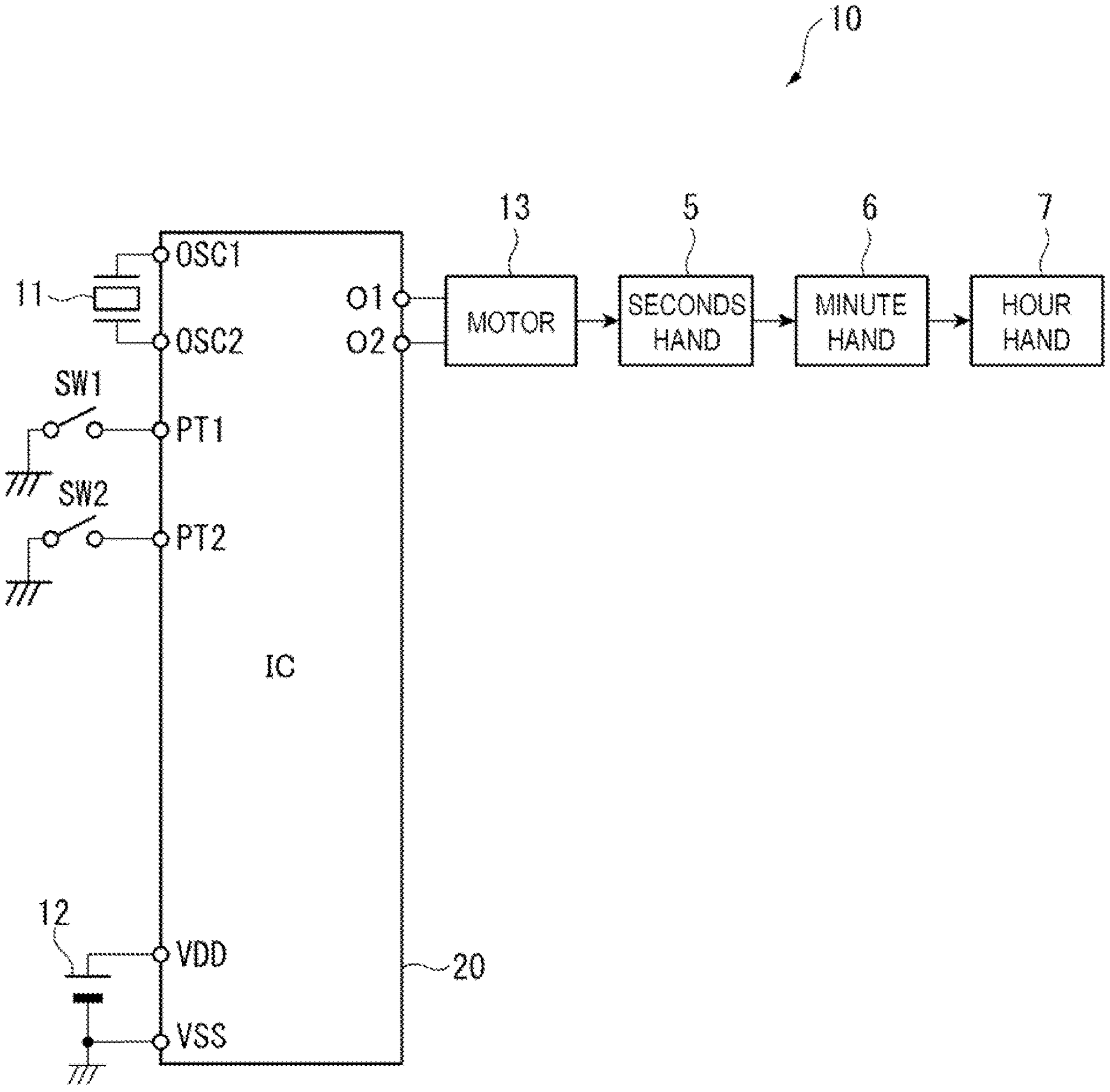
FIG. 2 is a circuit diagram illustrating a circuit configuration of the electronic watch according to the first exemplary embodiment.

FIG. 2 is a circuit diagram illustrating a circuit configuration of the electronic watch 1.

As illustrated in FIG. 2, the electronic watch 1 includes a movement 10.

The movement 10 includes the seconds hand 5, the minute hand 6, the hour hand 7, a crystal oscillator 11 being a signal source, a battery 12 being a power source, a switch SW1 turned on and off in conjunction with an operation on the button 9, a switch SW2 turned on and off in conjunction with a pull-out operation on the crown 8, a motor 13, and an IC 20 for a watch.

The crystal oscillator 11 is driven by an oscillating circuit 21, which will be described below, and generates an oscillation signal.

The battery 12 is formed of a primary battery or a secondary battery, and generates a drive voltage V that drives the motor 13 and the IC 20. In other words, the battery 12 is one example of a power source of the present disclosure. Further, When the battery 12 is a secondary battery, the battery 12 is charged by a solar cell or the like (not illustrated).

The switch SW1 is input in conjunction with the button 9, and is in an ON state in a state in which the button 9 is pressed and is in an OFF state in a state in which the button 9 is not pressed, for example.

The switch SW2 is a slide switch operated in conjunction with pulling-out of the crown 8. In the present exemplary embodiment, the switch SW2 is in an ON state in a state in which the crown 8 is pulled out to a first stage, and is in an OFF state in a state in which the crown 8 is pulled out to a zero-th stage.

Figure 4:
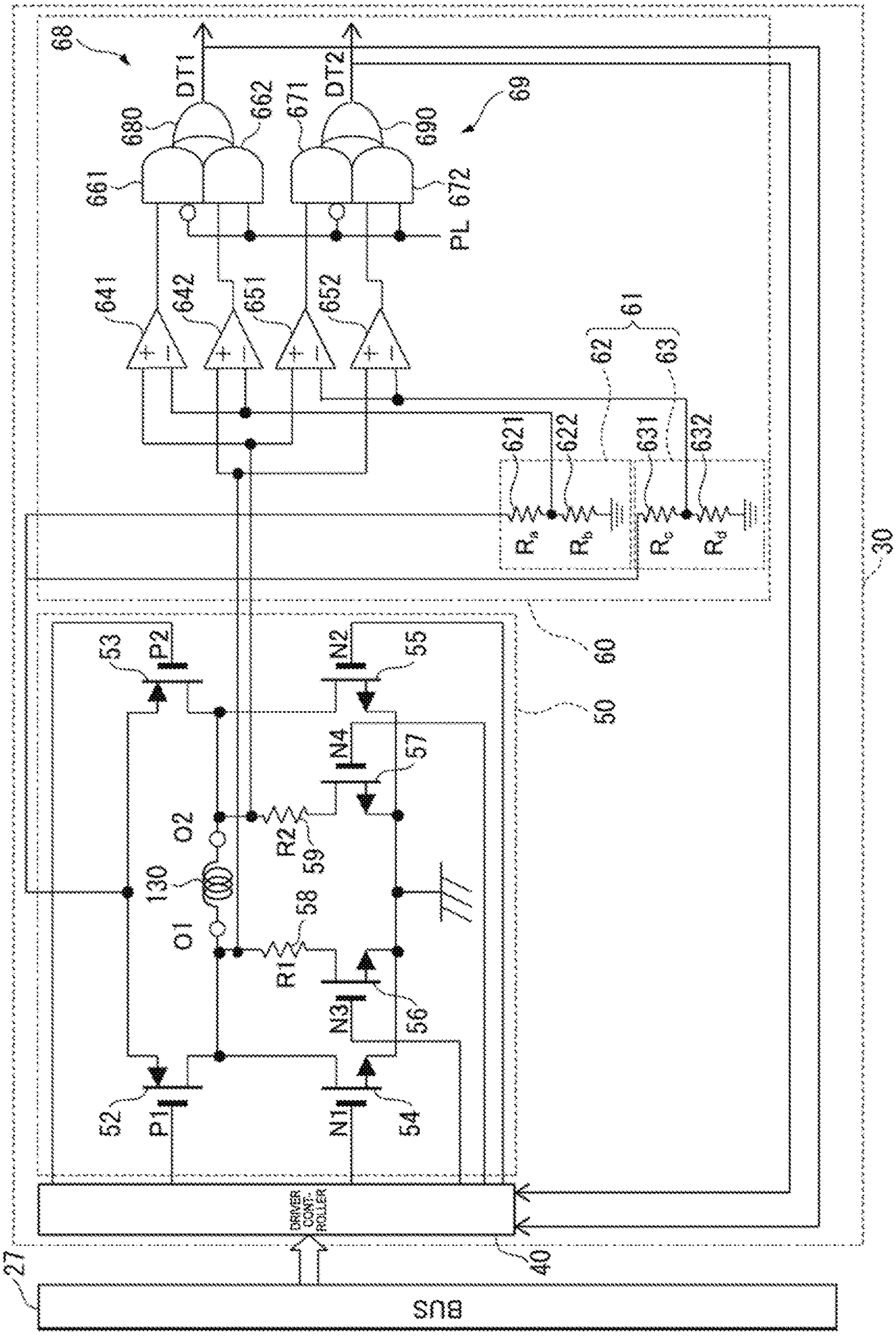
FIG. 4 is a circuit diagram illustrating a configuration of a motor control circuit according to the first exemplary embodiment.

The motor 13 includes a stator and a rotor (not illustrated), a coil 130 illustrated in FIG. 4, and the like. In the present exemplary embodiment, the motor 13 is a bipolar single-phase stepping motor used for an electronic watch, and is driven by a motor drive signal output from output terminals O1 and O2 of the IC 20 as described below.

Further, the seconds hand 5, the minute hand 6, and the hour hand 7 are operated in conjunction with each other by a train wheel (not illustrated), are driven by the motor 13, and display a second, a minute, and an hour. Note that, in the present exemplary embodiment, one motor 13 drives the seconds hand 5, the minute hand 6, and the hour hand 7, but a plurality of motors such as a motor that drives the seconds hand 5 and a motor that drives the minute hand 6 and the hour hand 7, for example, may be provided.

The IC 20 includes connection terminals OSC1 and OSC2 to which the crystal oscillator 11 is connected, input/output terminals PT1 and PT2 to which the switches SW1 and SW2 are connected, power source terminals VDD and VSS to which the battery 12 is connected, and the output terminals O1 and O2 connected to the coil 130 of the motor 13.

Note that, in the present exemplary embodiment, a positive electrode of the battery 12 is connected to the power supply terminal VDD on a high potential side, a negative electrode is connected to the power source terminal VSS on a low potential side, and the power source terminal VSS on the low potential side is set to be grounded.

Circuit Configuration of IC

Figure 3:
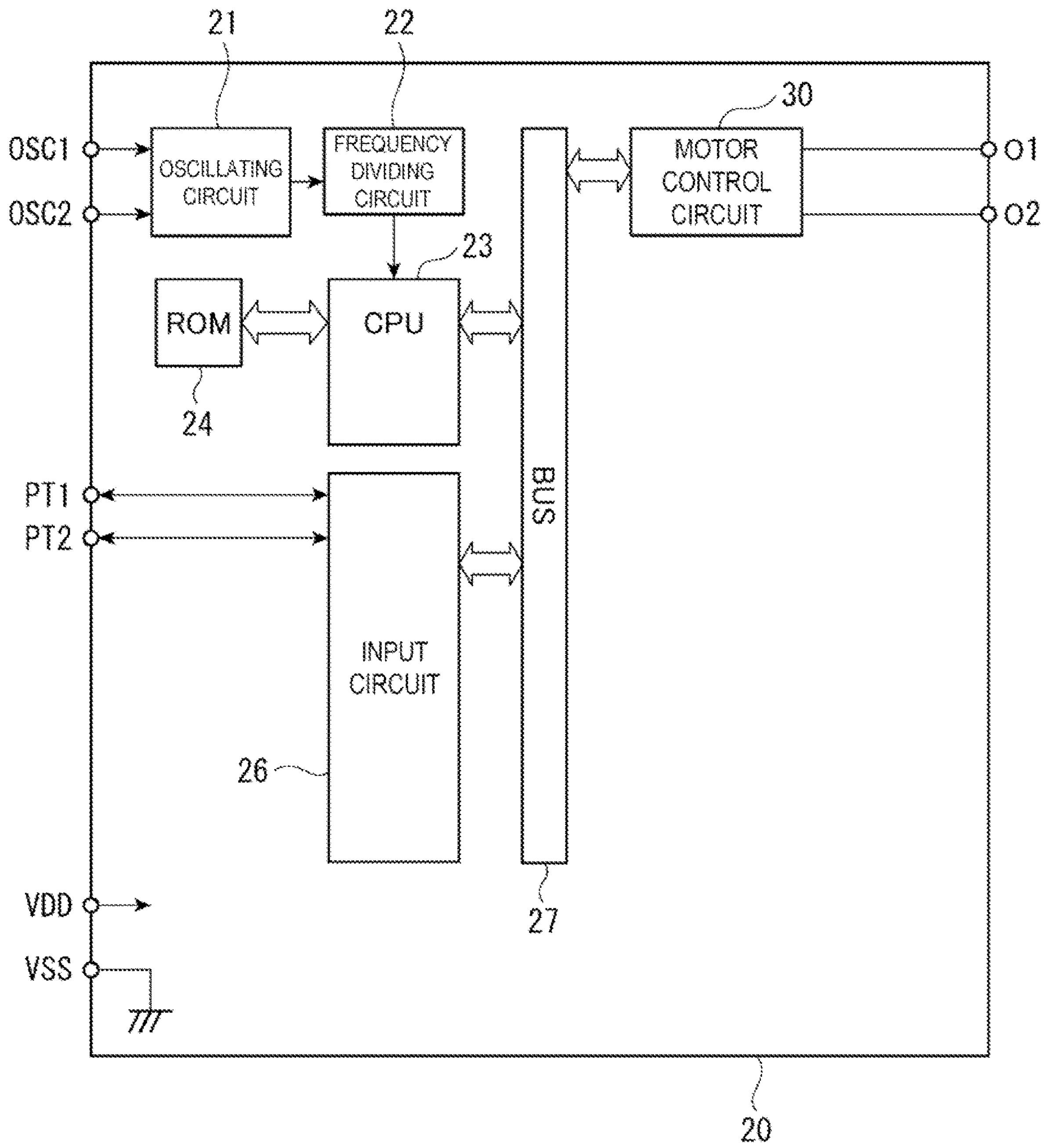
FIG. 3 is a configuration diagram illustrating a configuration of an IC according to the first exemplary embodiment.

FIG. 3 is a circuit diagram illustrating a circuit configuration of the IC 20.

As illustrated in FIG. 3, the IC 20 includes the oscillating circuit 21, a frequency dividing circuit 22, a CPU 23 for controlling the electronic watch 1, a ROM 24, an input circuit 26, a BUS 27, and a motor control circuit 30. Note that CPU is an abbreviation for a "Central Processing Unit", and ROM is an abbreviation for a "Read Only Memory".

The oscillating circuit 21 causes the crystal oscillator 11 being a reference signal source to oscillate at a high frequency, and outputs an oscillation signal at a predetermined frequency generated by the high frequency oscillation to the frequency dividing circuit 22. Note that the predetermined frequency is 32768 Hz.

The frequency dividing circuit 22 frequency-divides the output of the oscillating circuit 21 into the predetermined frequency, and supplies a timing signal to the CPU 23.

The ROM 24 stores various programs executed by the CPU 23. In the present exemplary embodiment, the ROM 24 stores a program for achieving a basic watch function and the like.

The CPU 23 executes a program stored in the ROM 24, and achieves the respective functions described above.

The input circuit 26 outputs a state of the input/output terminals PT1 and PT2 to the BUS 27. The BUS 27 is used for data transfer and the like among the CPU 23, the input circuit 26, and the motor control circuit 30.

The motor control circuit 30 outputs a predetermined drive signal by an instruction input from the CPU 23 through the BUS 27.

Configuration of Motor Control Circuit

FIG. 4 is a circuit diagram illustrating a configuration of the motor control circuit 30.

As illustrated in FIG. 4, the motor control circuit 30 includes a driver controller 40, a driver 50, and a current detection circuit 60.

Driver Controller

The driver controller 40 outputs a drive signal for rotating a rotor of the motor 13 to the driver 50. In the present exemplary embodiment, the driver controller 40 includes a decoder, a timer, a differentiating circuit, an SR latch circuit, a flip-flop, an AND circuit, an OR circuit, and the like, which are not illustrated. Then, the driver controller 40 is configured as a logic circuit that outputs gate signals P1, P2, N1, N2, N3, and N4 to the driver 50. Note that the driver controller 40 is not limited to the above-described configuration, and may be formed of a control device such as a CPU, for example, and may be configured so as to be able to directly control each of transistors 52 to 57 of the driver 50, which will be described below, via the BUS 27.

Driver

The driver 50 includes two Pch transistors 52 and 53, four Nch transistors 54, 55, 56, and 57, and two detection resistors 58 and 59. Each of the transistors 52 to 57 is controlled by a drive signal output from the driver controller 40, and supplies a current I in both forward and reverse directions to the coil 130 of the motor 13.

Here, in the present exemplary embodiment, the driver 50 is controlled so as to turn off a supply of the current I when the current I flowing to the coil 130 exceeds a maximum current threshold value Imax, and turn on the supply of the current I when the current I flowing to the coil 130 falls below a minimum current threshold value Imin.

Current Detection Circuit

The current detection circuit 60 includes a target current value setter 61, comparators 641, 642, 651, and 652, and composite gates 68 and 69. The composite gate 68 is one element having a function equivalent to that of a combination of AND circuits 661 and 662 and an OR circuit 680. The composite gate 69 is one element having a function equivalent to that of a combination of AND circuits 671 and 672 and an OR circuit 690.

Note that the current detection circuit 60 is one example of a current detector of the present disclosure.

The target current value setter 61 includes a first resistor voltage dividing circuit 62 and a second resistor voltage dividing circuit 63.

The first resistor voltage dividing circuit 62 is configured as a resistor voltage dividing circuit including a first resistor 621 and a second resistor 622 connected in series. Then, the first resistor voltage dividing circuit 62 is configured so as to input the drive voltage V generated by the battery 12 and output an output voltage V1 in accordance with resistance values of the first resistor 621 and the second resistor 622.

Specifically, the resistance values of the first resistor 621 and the second resistor 622 are set to Ra and Rb, respectively. Then, the resistance values Ra and Rb are configured so as to satisfy the following equation (1).

$$V1=[Rb/(Ra+Rb)]\times V \quad (1)$$

Here, in the present exemplary embodiment, a reference maximum current threshold value Imaxst is set as the maximum current threshold value Imax when the drive voltage V is a reference drive voltage Vs. Then, the resistance values Ra and Rb are set such that a potential of the output voltage V1 output from the first resistor voltage dividing circuit 62 corresponds to voltages generated at both ends of the detection resistors 58 and 59 when the reference maximum current threshold value Imaxst flows to the coil 130 in a case in which the drive voltage V is the reference drive voltage Vs. In other words, the first resistor voltage dividing circuit 62 is configured so as to set the maximum current threshold value Imax in proportion to the drive voltage V. Note that the maximum current threshold value Imax is one example of a target current value of the present disclosure.

Similarly to the first resistor voltage dividing circuit 62 described above, the second resistor voltage dividing circuit 63 is configured as a resistor voltage dividing circuit including a third resistor 631 and a fourth resistor 632 connected in series. Then, the second resistor voltage dividing circuit 63 is configured so as to input the drive voltage V and output an output voltage V2 in accordance with resistance values of the third resistor 631 and the fourth resistor 632.

Specifically, the resistance values of the third resistor 631 and the fourth resistor 632 are Rc and Rd, respectively. Then, the resistance values Rc and Rd are configured so as to satisfy the following equation (2).

$$V2=[Rd/(Rc+Rd)]\times V \quad (2)$$

Here, in the present exemplary embodiment, a reference minimum current threshold value Iminst is set as the minimum current threshold value Imin when the drive voltage V is the reference drive voltage Vs. Then, the resistance values Rc and Rd are set such that a potential of the output voltage V2 output from the second resistor voltage dividing circuit 63 corresponds to voltages generated at both ends of the detection resistors 58 and 59 when the reference minimum current threshold value Iminst flows to the coil 130 in a case in which the drive voltage V is the reference drive voltage Vs. In other words, the second resistor voltage dividing circuit 63 is configured so as to set the minimum current threshold value Imin in proportion to the drive voltage V. Note that the minimum current threshold value Imin is one example of a target current value of the present disclosure.

The comparators 641 and 642 respectively compare voltages generated at both ends of the detection resistors 58 and 59 having the resistance values R1 and R2 with the output voltage V1 of the first resistor voltage dividing circuit 62.

A drive polarity signal PL output from the driver controller 40 is inverted and input to the AND circuit 661. Since the drive polarity signal PL is input to the AND circuit 662 without any change, the output of one of the comparators 641 and 642 selected by the drive polarity signal PL is output as a detection signal DT1.

In this way, when the current I flowing to the coil 130 is equal to or greater than the maximum current threshold value Imax, the voltages generated at both ends of the detection resistors 58 and 59 exceed the output voltage V1 of the first resistor voltage dividing circuit 62, and thus the detection signal DT1 is at an H level. On the other hand, when the current I falls below the maximum current threshold value Imax, the detection signal DT1 is at an L level. Therefore, the first resistor voltage dividing circuit 62, the comparators 641 and 642, and the composite gate 68 of the current detection circuit 60 are configured so as to be able to detect that the current I flowing to the coil 130 exceeds the maximum current threshold value Imax.

The comparators 651 and 652 respectively compare voltages generated at both ends of the detection resistors 58 and 59 having the resistance values R1 and R2 with the output voltage V2 of the second resistor voltage dividing circuit 63.

Since the drive polarity signal PL is inverted and input to the AND circuit 671 and the drive polarity signal PL is input to the AND circuit 672 without any change, the output of one of the comparators 651 and 652 selected by the drive polarity signal PL is output as a detection signal DT2.

In this way, when the current I flowing to the coil 130 is equal to or greater than the minimum current threshold value Imin, the voltages generated at both ends of the detection resistors 58 and 59 exceed the output voltage V2 of the second resistor voltage dividing circuit 63, and thus the detection signal DT2 is at the H level. On the other hand, when the current I falls below the minimum current threshold value Imin, the detection signal DT2 is at the L level. Therefore, the second resistor voltage dividing circuit 63, the comparators 651 and 652, and the composite gate 69 of the current detection circuit 60 are configured so as to be able to detect that the current I flowing to the coil 130 is smaller than the minimum current threshold value Imin.

Control Processing of Motor Control Circuit

Next, a control method by the motor control circuit 30 according to the present exemplary embodiment will be described with reference to a flowchart in FIG. 5.

Figure 5:
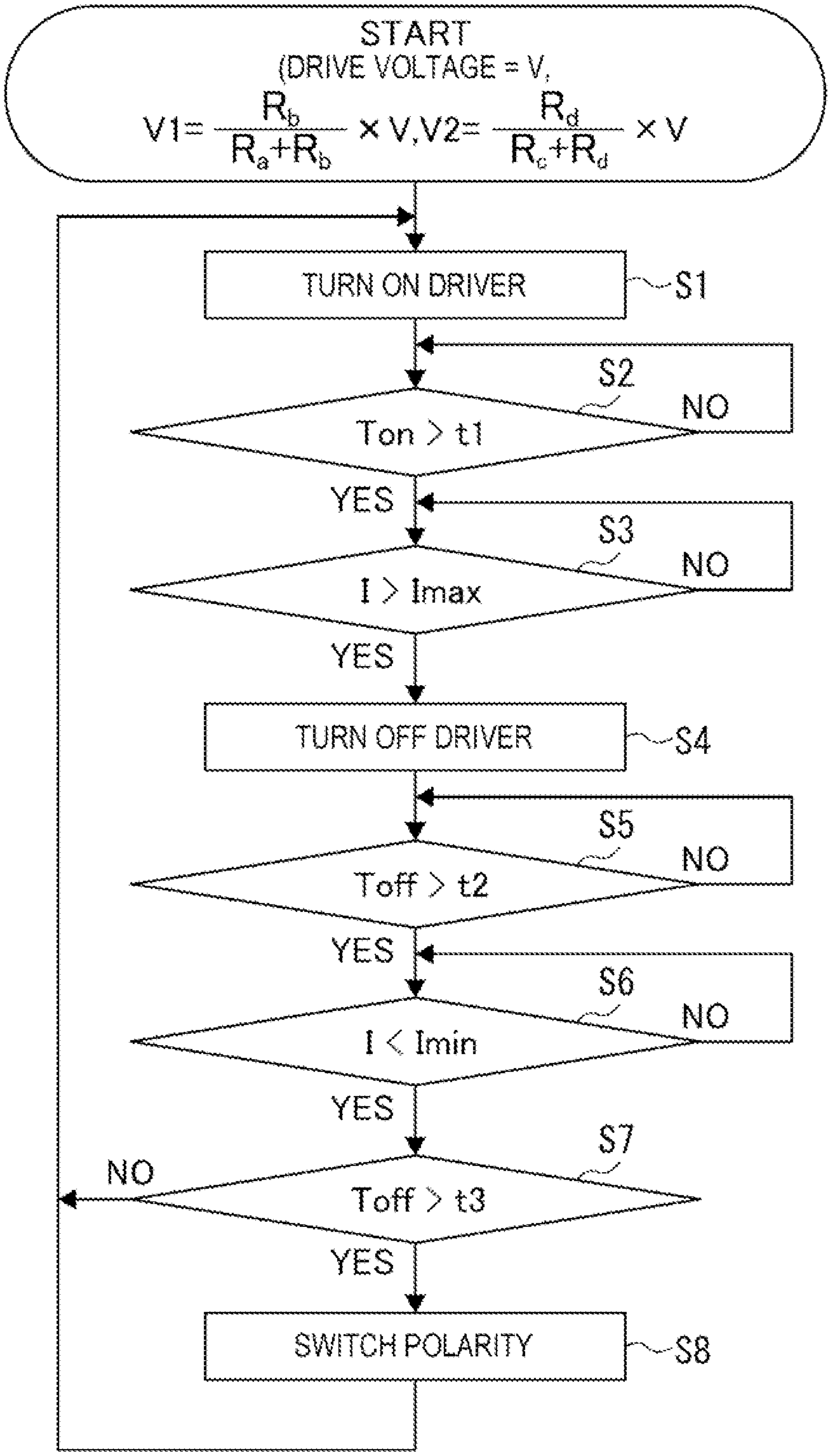
FIG. 5 is a flowchart illustrating motor control processing according to the first exemplary embodiment.

As illustrated in FIG. 5, when the control processing of the motor control circuit 30 starts, the driver controller 40 turns on the driver 50 of the motor 13 by the gate signals P1, P2, N1, N2, N3, and N4 in step S1.

In the present exemplary embodiment, when the driver 50 is turned on, P1 is at the L level and P2 is at the H level, and the Pch transistor 52 is turned on and the Pch transistor 53 is turned off. Further, N1 to N3 are at the L level, N4 is at the H level, the Nch transistors 54, 55, and 56 are turned off, and the Nch transistor 57 is turned on. Thus, a drive current flows through the Pch transistor 52, the output terminal O1, the coil 130, the output terminal O2, the detection resistor 59, and the Nch transistor 57.

Next, in step S2, the driver controller 40 determines whether or not an ON time Ton, which is a duration after the driver 50 is turned on, exceeds a predetermined period of time t1. When it is determined that it is No in step S2, the driver controller 40 repeatedly performs the processing in step S2.

Note that, as the predetermined period of time t1, a minimum period of time during which the driver 50 is turned on is set in order to suppress frequent repetition of ON and OFF of the driver 50 and an increase in current consumption due to a through current and a charge-discharge current generated at that time.

When it is determined that it is Yes in step S2, the current detection circuit 60 determines whether or not the current I flowing through the coil 130 exceeds the maximum current threshold value Imax in step S3.

Here, as described above, in the present exemplary embodiment, the maximum current threshold value Imax is set by the first resistor voltage dividing circuit 62 in accordance with the drive voltage V of the battery 12.

Figure 6:
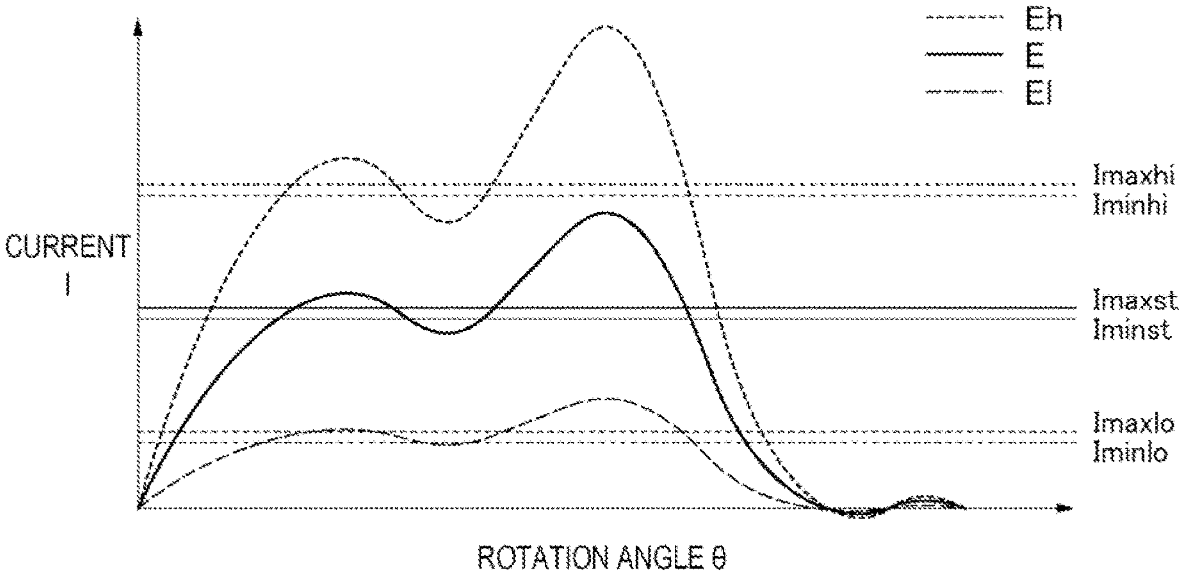
FIG. 6 is a diagram illustrating a relationship between a rotation angle of a rotor and a current waveform.

FIG. 6 is a diagram illustrating a relationship between a rotation angle θ of the rotor of the motor 13 and a current waveform E. FIG. 6 illustrates the current waveform E when the drive voltage V is the reference drive voltage Vs, a current waveform Eh when the drive voltage V is a high drive voltage Vh higher than the reference drive voltage Vs, and a current waveform El when the drive voltage V is a low drive voltage Vl lower than the reference drive voltage Vs.

As illustrated in FIG. 6, the current waveform E of the current I flowing to the coil 130 changes in accordance with the rotation angle θ of the rotor.

At this time, for example, when the drive voltage V becomes the high drive voltage Vh by fully charging the battery 12 and the like, a width in the vertical direction of the current waveform becomes wider, as indicated by the current waveform Eh in FIG. 6. Thus, when the maximum current threshold value Imax and the minimum current threshold value Imin are set to fixed values, the maximum current threshold value Imax and the minimum current threshold value Imin are relatively low with respect to the current waveform Eh. As a result, the ON time Ton is shortened, and thus the energy supplied to the rotor of the motor 13 is reduced. For this reason, there is a risk that the rotor may not rotate.

Further, for example, when the drive voltage V becomes the low drive voltage Vl due to a decrease in charge amount of the battery 12, a width in the vertical direction of the current waveform becomes narrower, as indicated by the current waveform El in FIG. 6. Thus, when the maximum current threshold value Imax and the minimum current threshold value Imin are set to fixed values, the maximum current threshold value Imax and the minimum current threshold value Imin are relatively high with respect to the current waveform El. As a result, the ON time Ton increases, and thus the energy supplied to the rotor of the motor 13 is increased. For this reason, there is a risk that the rotor may lose synchronization.

In other words, when the maximum current threshold value Imax and the minimum current threshold value Imin are set to fixed values, there is a risk that the rotor may not be stably rotated as the drive voltage V fluctuates.

In contrast, in the present exemplary embodiment, the maximum current threshold value Imax and the minimum current threshold value Imin are set in accordance with the drive voltage V. For example, in a case of the high drive voltage Vh, a threshold value of the current I is set to a high value in accordance with the drive voltage V, such as a high maximum current threshold value Imaxhi and a high minimum current threshold value Iminhi illustrated in FIG. 6. On the other hand, in a case of the low drive voltage Vl, a threshold value of the current I is set to a low value in accordance with the drive voltage V, such as a low maximum current threshold value Imaxlo and a low minimum current threshold value Iminlo illustrated in FIG. 6. In this way, even when a width in the vertical direction of the current waveform E changes due to the fluctuation in the drive voltage V, the maximum current threshold value Imax and the minimum current threshold value Imin are accordingly set, and thus the ON time Ton can be set to an appropriate length. For this reason, rotation of the rotor can be stably controlled. Note that the high drive voltage Vh is one example of a first voltage and the low drive voltage Vl is one example of a second voltage, and the high maximum current threshold value Imaxhi and the high minimum current threshold value Iminhi are one example of a first current value, and the low maximum current threshold value Imaxlo and the low minimum current threshold value Iminlo are one example of a second current value.

Returning to FIG. 5, when it is determined that it is No in step S3, the current detection circuit 60 continues the determination processing in step S3 until the current I exceeds the maximum current threshold value Imax, that is, until the voltages generated in the detection resistors 58 and 59 exceed the output voltage V1 of the first resistor voltage dividing circuit 62.

On the other hand, when it is determined that it is Yes in step S3, the driver controller 40 turns off the driver 50 by the gate signals P1, P2, N1, N2, N3, and N4 in step S4. Specifically, P1 is at the H level, P2 is at the H level, N1 is at the H level, N2 is at the L level, N3 is at the H level, and N4 is at the H level. Thus, both ends of the coil 130 are connected to the power source terminal VSS and short-circuited, and the supply of the current I from the driver 50 to the coil 130 is also stopped.

Next, in step S5, the driver controller 40 determines whether or not an OFF time Toff, which is a duration after the driver 50 is turned off, exceeds a predetermined period of time t2. When it is determined that it is No in step S5, the driver controller 40 repeatedly performs the processing in step S5.

Note that, as the predetermined period of time t2, similarly to the predetermined period of time t1, a minimum period of time during which the driver 50 is turned off is set in order to suppress frequent repetition of ON and OFF of the driver 50.

When it is determined that it is Yes in step S5, the current detection circuit 60 determines whether or not the current I flowing through the coil 130 falls below the minimum current threshold value Imin in step S6.

When it is determined that it is No in step S6, the current detection circuit 60 continues the determination processing in step S6 until the current I falls below the minimum current threshold value Imin, that is, until the voltages generated in the detection resistors 58 and 59 exceed the output voltage V2 of the second resistor voltage dividing circuit 63.

On the other hand, when it is determined that it is Yes in step S6, the driver controller 40 determines whether or not the OFF time Toff exceeds a predetermined period of time t3 in step S7. Note that the predetermined period of time t3 is one example of a predetermined condition of the present disclosure.

When it is determined that it is No in step S7, return to step S1 and the processing from steps S1 to S7 is repeated.

On the other hand, when it is determined that it is Yes in step S7, the driver controller 40 performs switching of polarity in step S8 and the processing returns to step S1.

In this way, in the present exemplary embodiment, the driver controller 40 turns on and off the driver 50 in accordance with the current I, and switches polarity by the OFF time Toff based on the current I.

Advantageous Effects of First Exemplary Embodiment

According to the first exemplary embodiment, the following advantageous effects can be produced.

In the present exemplary embodiment, the electronic watch 1 includes the target current value setter 61 that sets the maximum current threshold value Imax and the minimum current threshold value Imin in accordance with the drive voltage V.

In this way, even when the drive voltage V of the battery 12 fluctuates due to charging or the like, the maximum current threshold value Imax and the minimum current threshold value Imin can be set in accordance with the drive voltage V. Thus, since the ON time Ton can be set to an appropriate length, the rotor of the motor 13 can be stably rotated. Note that, in the present exemplary embodiment, as a result of verification under a predetermined condition, it has been confirmed that a range of the drive voltage V in which the rotor can be stably rotated can be approximately twice as compared to that when the maximum current threshold value Imax and the minimum current threshold value Imin are set to fixed values.

Further, when the maximum current threshold value Imax and the minimum current threshold value Imin are set to fixed values, a fluctuation in voltage input to the circuit that generates the maximum current threshold value Imax and the minimum current threshold value Imin needs to be smoothed, and thus a constant voltage power supply circuit needs to be provided. In contrast, in the present exemplary embodiment, since the maximum current threshold value Imax and the minimum current threshold value Imin are set in accordance with the drive voltage V, the constant voltage power supply circuit does not need to be provided with the intention as described above. In other words, the control processing by the motor control circuit 30 can also be applied to the electronic watch 1 that does not include the constant voltage power supply circuit. Thus, a circuit configuration of the electronic watch 1 can be simplified.

In the present exemplary embodiment, the target current value setter 61 includes the first resistor voltage dividing circuit 62 and the second resistor voltage dividing circuit 63 that generate the maximum current threshold value Imax and the minimum current threshold value Imin in proportion to the drive voltage V.

In this way, the circuit that generates the maximum current threshold value Imax and the minimum current threshold value Imin in proportion to the drive voltage V can be simplified.

Second Exemplary Embodiment

Next, a second exemplary embodiment of the present disclosure will be described below with reference to FIGS. 7 and 8. The second exemplary embodiment is different from the first exemplary embodiment described above in that a target current value setter 231A is provided in a CPU 23A.

Note that, in the second embodiment, the same or similar components as or to those of the first embodiment will be given the same reference numerals and detailed description will be omitted or simplified.

Configuration of CPU and Motor Control Circuit

Figure 7:
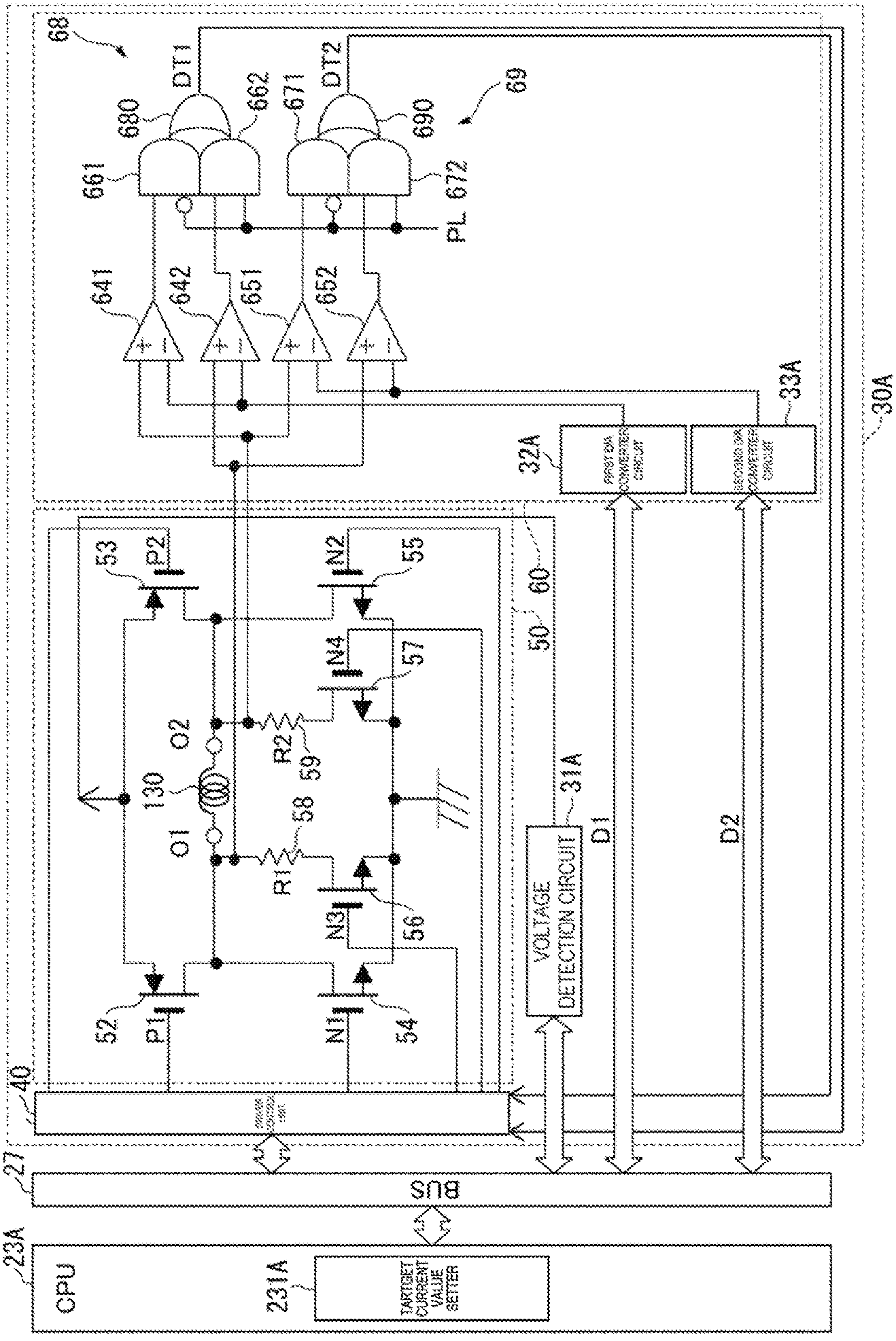
FIG. 7 is a circuit diagram illustrating a configuration of a motor control circuit according to a second exemplary embodiment.

FIG. 7 is a circuit diagram illustrating a configuration of the CPU 23A and a motor control circuit 30A.

As illustrated in FIG. 7, the CPU 23A includes the target current value setter 231A. Further, the motor control circuit 30A includes a voltage detection circuit 31A, a first D/A converter circuit 32A, and a second D/A converter circuit 33A.

The voltage detection circuit 31A is configured so as to be able to detect the drive voltage V generated by the battery 12 and output a detection value Vm to the CPU 23A.

The target current value setter 231A calculates the maximum current threshold value Imax and the minimum current threshold value Imin in accordance with the detection value Vm of the voltage detection circuit 31A.

Specifically, the target current value setter 231A calculates the maximum current threshold value Imax and the minimum current threshold value Imin based on the following equations (3) and (4).

$$I\text{max}=a\times Vm+b \tag{3}$$

$$I\text{min}=c\times Vm+d \tag{4}$$

In other words, the target current value setter 231A calculates the maximum current threshold value Imax and the minimum current threshold value Imin based on proportional constants a and c and offset values b and d.

Then, the target current value setter 231A sets the maximum current threshold value Imax and the minimum current threshold value Imin according to the computation result.

Specifically, the target current value setter 231A outputs a digital signal D1 corresponding to the calculated maximum current threshold value Imax to the first D/A converter circuit 32A. Then, the digital signal D1 is converted to an output voltage V1 by the first D/A converter circuit 32A and is input to the comparators 641 and 642.

Note that, similarly to the first exemplary embodiment described above, the digital signal D1 and the first D/A converter circuit 32A are configured such that a potential of the output voltage V1 corresponds to voltages generated at both ends of the detection resistors 58 and 59 when the reference maximum current threshold voltage Imaxst flows to the coil 130.

Further, the target current value setter 231A outputs a digital signal D2 corresponding to the calculated minimum current threshold value Imin to the second D/A converter circuit 33A. Then, the digital signal D2 is converted to an output voltage V2 by the second D/A converter circuit 33A and is input to the comparators 651 and 652.

Note that, similarly to the first exemplary embodiment described above, the digital signal D2 and the second D/A converter circuit 33A are configured such that a potential of the output voltage V2 corresponds to voltages generated at both ends of the detection resistors 58 and 59 when the reference minimum current threshold voltage Iminst flows to the coil 130.

Control Processing of Motor Control Circuit

Next, a control method by the motor control circuit 30A according to the present exemplary embodiment will be described with reference to a flowchart in FIG. 8.

Note that, in the present exemplary embodiment, steps S1A to S8A are the same as the steps S1 to S8 in the first exemplary embodiment described above, and thus descriptions thereof will be omitted.

Figure 8:
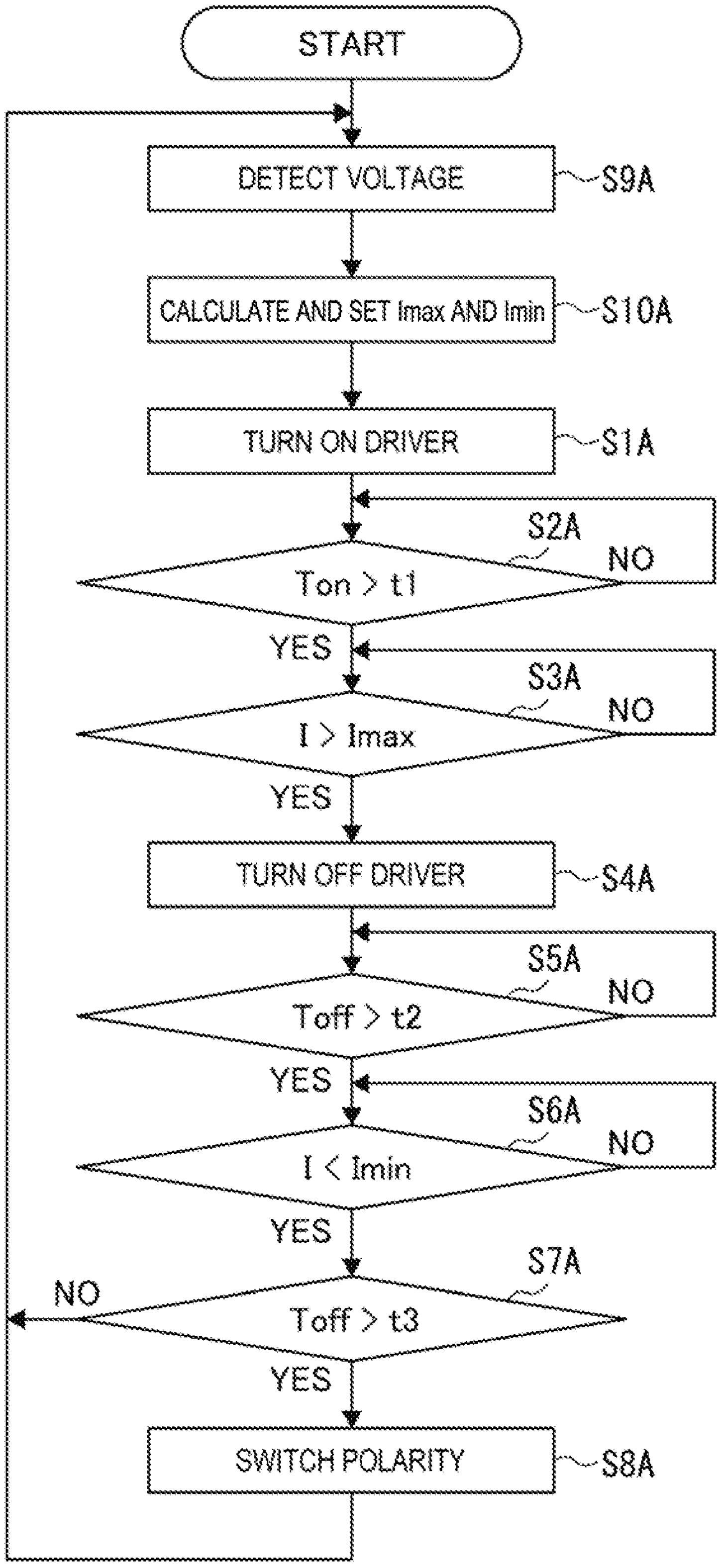
FIG. 8 is a flowchart illustrating motor control processing according to the second exemplary embodiment.

As illustrated in FIG. 8, when the control processing of the motor control circuit 30A starts, the voltage detection circuit 31A detects the drive voltage V in step S9A. Then, the voltage detection circuit 31A outputs the detection value Vm to the CPU 23A.

Next, the target current value setter 231A of the CPU 23A calculates the maximum current threshold value Imax and the minimum current threshold value Imin based on the equations (3) and (4) described above in step S10A. Then, the target current value setter 231A sets the maximum current threshold value Imax and the minimum current threshold value Imin according to the computation result.

Advantageous Effects of Second Exemplary Embodiment

According to the second exemplary embodiment, the following advantageous effects can be produced.

In the present exemplary embodiment, the electronic watch 1 includes the voltage detection circuit 31A that detects the drive voltage V. Then, the target current value setter 231A calculates and sets the maximum current threshold value Imax and the minimum current threshold value Imin in accordance with the detection value Vm of the voltage detection circuit 31A.

In this way, the maximum current threshold value Imax and the minimum current threshold value Imin can be set based on the offset values b and d in addition to the proportional constants a and c. For this reason, as compared to a case in which the maximum current threshold value Imax and the minimum current threshold value Imin are set in proportion to the drive voltage V, the maximum current threshold value Imax and the minimum current threshold value Imin can be set to a more appropriate value.

Modification Example

Note that the present disclosure is not limited to each of the exemplary embodiments described above, and variations, modifications, and the like within the scope in which the object of the present disclosure can be achieved are included in the present disclosure.

In each of the exemplary embodiments described above, the power source that generates the drive voltage V is formed of the battery 12, but the present disclosure is not limited thereto. For example, the power source that generates the drive voltage V may include the battery 12 and a booster circuit.

In this case, for example, when the drive voltage V is boosted by the booster circuit with the intention of fast-forward driving the hands 5 to 7, the maximum current threshold value Imax and the minimum current threshold value Imin are set in accordance with the boosted drive voltage V. For this reason, the driving of the rotor when the hands 5 to 7 are fast-forward driven can be stabilized.

In each of the exemplary embodiments described above, the driver controller 40 is configured so as to switch polarity based on the OFF time Toff, but the present disclosure is not limited thereto. For example, the driver controller 40 may be configured so as to switch polarity based on the ON time Ton. In this case, the polarity is switched without waiting until the current I falls below the minimum current threshold value Imin, and thus current consumption can be suppressed.

In each of the exemplary embodiments described above, the target current value setters 61 and 231A are configured so as to set the maximum current threshold value Imax and the minimum current threshold value Imin, but the present disclosure is not limited thereto. For example, the target current value setters 61 and 231A may be configured so as to set one of the maximum current threshold value Imax and the minimum current threshold value Imin.

Further, for example, in a case in which the target current value setters 61 and 231A set only the maximum current threshold value Imax, the driver controller 40 may be configured so as to control the driver 50 to the ON state at a point in time when a preset time has elapsed since the current I exceeds the maximum current threshold value Imax and the driver 50 is brought into the OFF state.

In the second exemplary embodiment, the target current value setter 231A is configured so as to calculate the maximum current threshold value Imax and the minimum current threshold value Imin by a linear function of the equations (3) and (4) described above, but the present disclosure is not limited thereto. For example, the target current value setter 231A may be configured so as to calculate the maximum current threshold value Imax and the minimum current threshold value Imin by a quadratic function or an exponential function. Furthermore, the target current value setter 231A may be configured so as to extract the maximum current threshold value Imax and the minimum current threshold value Imin in accordance with the drive voltage V from a computation table that stores a relationship among the drive voltage V, the maximum current threshold value Imax, and the minimum current threshold value Imin, and set the maximum current threshold value Imax and the minimum current threshold value Imin. Note that, in the present disclosure, it is assumed that extracting the maximum current threshold value Imax and the minimum current threshold value Imin by using the computation table by the target current value setter 231A is also included as one aspect of the computation.

In each of the exemplary embodiments described above, the electronic watch 1 is a wristwatch type, but may be a table clock, for example. Further, the motor control circuit for a watch according to the present disclosure is not limited to controlling a motor that drives a hand of a watch, and can also be applied to, for example, a motor control circuit for a date indicator and the like.

What is claimed is:

1. An electronic watch, comprising: a motor including a coil;

a power source configured to generate a drive voltage for driving the motor;

a driver controlled to be in an ON state in which a drive current is supplied to the coil and an OFF state in which the drive current is not supplied to the coil;

a current detector configured to detect a current value of a current flowing to the coil;

a target current value setter configured to set a target current value in accordance with the drive voltage; and a driver controller configured to compare the current value detected by the current detector with the target current value, control the driver to be in the ON state or the OFF state in accordance with a result of the comparison, and switch polarity of the drive current when detecting that an ON time, which is a duration of the ON state of the driver, meets a predetermined condition or an OFF time, which is a duration of the OFF state of the driver, meets a predetermined condition.

2. The electronic watch according to claim 1, wherein the target current value setter includes a resistor voltage dividing circuit configured to generate the target current value in accordance with the drive voltage.

3. The electronic watch according to claim 1, comprising a voltage detection circuit configured to detect the drive voltage, wherein the target current value setter calculates and then sets the target current value in accordance with a value detected by the voltage detection circuit.

4. The electronic watch according to claim 1, wherein the target current value setter sets the target current value to a first current value when the drive voltage is a first voltage, and sets the target current value to a second current value when the drive voltage is a second voltage, and the first voltage is higher than the second voltage, and the first current value is higher than the second current value.

* * * * *